US011536542B2

(12) United States Patent
Arwari

(10) Patent No.: US 11,536,542 B2
(45) Date of Patent: Dec. 27, 2022

(54) LIGHTING SYSTEM

(71) Applicant: University of Miami, Miami, FL (US)

(72) Inventor: Brian Arwari, Coral Gables, FL (US)

(73) Assignee: University of Miami, Miami, FL (US)

( * ) Notice: Subject to any disclaimer, the term of this patent is extended or adjusted under 35 U.S.C. 154(b) by 0 days.

(21) Appl. No.: 17/621,152

(22) PCT Filed: Jun. 29, 2020

(86) PCT No.: PCT/US2020/040162
§ 371 (c)(1),
(2) Date: Dec. 20, 2021

(87) PCT Pub. No.: WO2021/003109
PCT Pub. Date: Jan. 7, 2021

(65) Prior Publication Data
US 2022/0205763 A1  Jun. 30, 2022

Related U.S. Application Data

(60) Provisional application No. 62/868,876, filed on Jun. 29, 2019.

(51) Int. Cl.
*F41H 13/00* (2006.01)
*G02C 7/10* (2006.01)
(52) U.S. Cl.
CPC ......... *F41H 13/0056* (2013.01); *G02C 7/101* (2013.01)

(58) Field of Classification Search
None
See application file for complete search history.

(56) References Cited

U.S. PATENT DOCUMENTS

| 9,664,482 B1 * | 5/2017 | Boland ............... G02B 27/017 |
| 10,712,131 B2 * | 7/2020 | Poplawski ............... G02B 7/06 |
| 2005/0243224 A1 | 11/2005 | Choi et al. |
| 2016/0062148 A1 | 3/2016 | Brudz |
| 2018/0216919 A1 | 8/2018 | Palti |
| 2021/0239437 A1 * | 8/2021 | Taheri ..................... F41A 33/02 |

FOREIGN PATENT DOCUMENTS

| EP | 3173729 A1 * | 5/2017 | |
| WO | WO-2006125890 A1 * | 11/2006 | ............. A61F 9/023 |

OTHER PUBLICATIONS

Inernational Search Report and Written Opinion, issued by the USPTO as International Searching Authority, dated Oct. 30, 2020, for corresponding International App. No. PCT/US2020/040162.

* cited by examiner

*Primary Examiner* — Reginald S Tillman, Jr.
(74) *Attorney, Agent, or Firm* — Katherine Koenig; Koenig IP Works, PLLC

(57) ABSTRACT

Systems and devices for temporarily disabling an assailant or other target using disabling flashes of light from a light-emitting device. A tactical lighting system also includes protective eyewear that is paired with the light-emitting device and configured to shutter in synchronization with the pattern of disabling light flashes to protect the wearer's eyes while disabling an assailant or other target.

13 Claims, 11 Drawing Sheets

LIGHTING SYSTEM

CROSS-REFERENCE TO RELATED APPLICATIONS

This application is a U.S. National Phase Entry under 35 U.S.C. § 371 of International App. No. PCT/US2020/040162, filed Jun. 29, 2020, entitled LIGHTING SYSTEM, which is related to and claims the benefit of U.S. Provisional Application No. 62/868,876, filed Jun. 29, 2019, entitled LIGHTING SYSTEM, the entirety of both of which is incorporated herein by reference.

TECHNICAL FIELD

This disclosure relates to a tactical lighting system that includes a light-emitting device that emits a pattern of disabling light flashes and protective eyewear that is paired with the light-emitting device and configured to shutter in synchronization with the pattern of disabling light flashes to protect the wearer's eyes while disabling an assailant or other target or threat.

BACKGROUND

There is a growing epidemic of gunmen and other assailants causing tragedies and mass casualties worldwide. These assailants usually seek out vulnerable targets, such as large groups of unarmed people in locations that are unprotected. For example, targeted locations may include schools, cinemas, hotels, restaurants, sporting events, and the like. There is currently no consensus on the best way to protect these vulnerable targets and, therefore, they remain at risk.

Additionally, means currently used by law enforcement officers to control rioters, assailants, dangerous individuals, or other hazards are often ineffective and/or are potentially lethal. For example, tasers include electrodes that must penetrate the skin, and therefore can be ineffective up to 50% of the time, particularly on individuals wearing many layers of clothing. Tasers also cannot be activated repeatedly and cannot be used through glass, such as if a driver refuses to roll down his window during a traffic stop. Stun or flash-bang grenades are often used in hostage situations for remotely neutralizing a target and/or in mall or confined spaces. However, such grenades are potentially lethal to all in a blast radius, including law enforcement officers or military operatives. Further, these grenades have a limited effective area and can be used only once.

SUMMARY

Some embodiments advantageously provide a lighting system comprising: at least one light-emitting device, the at least one light-emitting device being configured to emit a pattern of a plurality of disabling light flashes; and at least one item of protective eyewear in wireless communication with and synchronized with the light-emitting device, the at least one item of protective eyewear being configured to transition between a first state and a second state according a signal received from the light-emitting device.

In one aspect of the embodiment, the at least one light-emitting device includes a random seed generator that generates a random pattern, the at least one light-emitting device being configured to transmit a signal to the at least one item of protective eyewear, the signal including the random pattern.

In one aspect of the embodiment, the at least one light-emitting device includes a first identification module and the at least one item of protective eyewear includes a second identification module, the at least one light-emitting device transmitting the signal to the at least one item of protective eyewear only when the first identification module recognizes the second identification module as being associated with an authorized device.

In one aspect of the embodiment, the at least one light-emitting device is configured to emit the plurality of disabling light flashes according to the random pattern, each of the plurality of disabling light flashes being at least approximately 100,000 lumens. In one aspect of the embodiment, the at least one item of protective eyewear is in the first state when the at least one light-emitting device is not emitting a disabling light flash of the plurality of disabling light flashes and is in the second state when the at least one light-emitting device is emitting a disabling light flash of the plurality of disabling light flashes. In one aspect of the embodiment, the at least one item of protective eyewear includes at least one lens, the at least one lens being in a transparent condition when the at least one item of protective eyewear is in the first state and the at least one lens being in an opaque condition when the at least one item of protective eyewear is in the second state.

In one aspect of the embodiment, the at least one light-emitting device is a light fixture configured to be installed in a permanent structure.

In one aspect of the embodiment, the at least one light-emitting device is a stun grenade.

In one aspect of the embodiment, the at least one light-emitting device is configured to be removably attached to at least one of a bulletproof vest and a riot shield.

In one aspect of the embodiment, the at least one light-emitting device includes processing circuitry, a communication controller, and at least one sensor, the at least one sensor being in communication with the processing circuitry and the communication controller.

In one aspect of the embodiment, the at least one light-emitting device includes a plurality of light-emitting devices, the plurality of light-emitting devices being in wireless communication with each other. In one aspect of the embodiment, the at least one sensor of each of the plurality of light-emitting devices is configured to record environmental data, the communication controller of each of the plurality of light-emitting devices being configured to transmit the recorded environmental data of a corresponding at least one sensor to the other of the plurality of light-emitting devices. In one aspect of the embodiment, the processing circuitry of at least one of the plurality of light-emitting devices is configured to: compile the recorded environmental data of each of the plurality of light-emitting devices; determine at least one environmental characteristic based on the compiled environmental data; and at least one of automatically activate the plurality of light-emitting devices and transmitting the determined at least one environmental characteristic to a remote device.

In one aspect of the embodiment, the at least one sensor is an audio sensor and the processing circuitry of the at least one of the plurality of light-emitting devices is configured to automatically activate at least one of the plurality of light-emitting devices when the audio sensor detects a sound having a decibel level of approximately 120 dB.

In one aspect of the embodiment, the at least one sensor includes a smoke sensor and an infrared sensor and the at least one environmental characteristic is a smoke density, the processing circuitry of the at least one of the plurality of light-emitting devices being configured to adjust a brightness of the plurality of disabling light flashes based on the smoke density.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
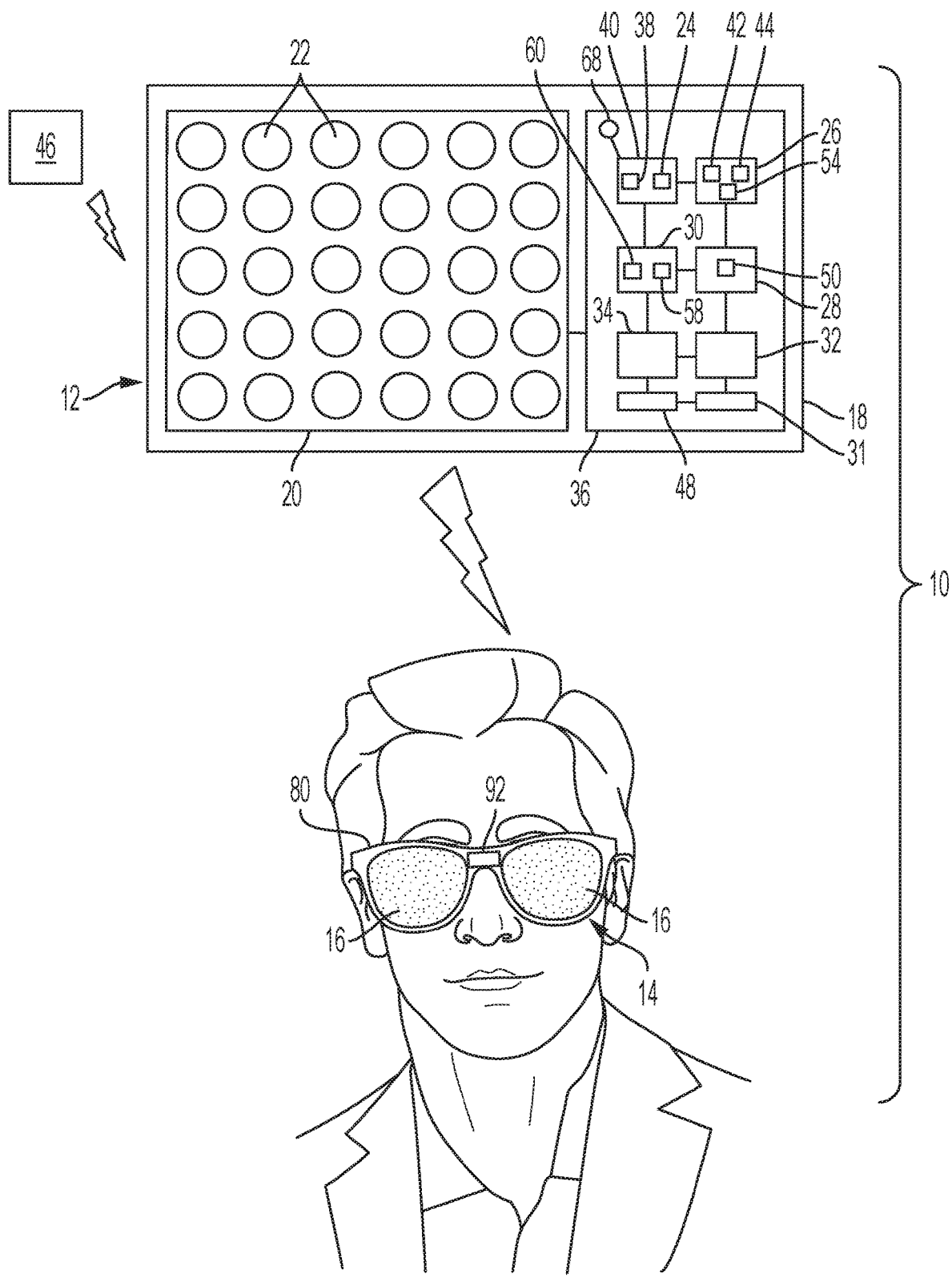
FIG. 1 shows a schematic diagram of an exemplary embodiment of a tactical lighting system, in accordance with the present disclosure.

The system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. As used herein, relational terms, such as "first," "second," "top," "bottom," and the like, may be used solely to distinguish one entity or element from another entity or element without necessarily requiring or implying any physical or logical relationship or order between such entities or elements. Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the figures in which like reference designators are used for like elements, an exemplary embodiment of a tactical lighting system 10 is shown in the schematic diagram of FIG. 1. In one embodiment, the tactical lighting system 10 (also referred to herein as the "system 10") generally includes a light-emitting device 12 (also referred to herein as the "device 12") and protective eyewear 14 (also referred to herein as "eyewear 14"). As is discussed in greater detail below, the device 12 and the eyewear 14 are in wireless communication with each other and are configured to be gated, synchronized, or paired with each other such that the eyewear 14 shutters (the lenses 16 rapidly alternate between a clear or transparent state or condition and a darkened or opaque state or condition) in synchronization with light emitted by the device 12 in a random pattern of disabling light flashes. In one embodiment, the lenses 16 change to the darkened or opaque state when the device 12 emits a flash of light and the lenses return to the transparent/translucent state during times when no light is emitted by the device 12. The eyewear 14 is shown and described in more detail in FIGS. 3-5. Thus, a wearer's eyes are protected by the eyewear 14 from the flashing light, which in some embodiments includes flashes of intense light (for example, at least approximately 100,000 lumens (±10,000 lumens) or, in one embodiment, between approximately 100,000 lumens (±10,000 lumens) and approximately two million lumens (±10,000 lumens) that are capable of disabling a person who is not wearing the eyewear 14, such as a potential assailant, rioter, or other threat or target. As used herein, the term "target" refers to potential assailants, rioters, or other threats and the term "non-target" refers to potential victims and/or first responders or other authorized users of the system 10 (that is, anyone other than the person or people whom the system 10 is meant to disable). In comparison, a standard 100 W light bulb emits approximately 1600 lumens and commercially available "super bright" flashlights emit between 4500 and 15,000 lumens. However, none of these are able to product light that is capable of disabling (for example, sufficient to functionally blind) a target.

Continuing to refer to FIG. 1, in one embodiment the device 12 includes a housing 18 and at least one light source 20 located at least partially within the housing 18. Exemplary embodiments of the device 12 are shown in FIGS. 6-15. In one embodiment, the at least one light source 20 includes an array of a plurality of light-emitting diodes (LEDs) 22 or similar light-emitting elements that are configured to emit intense light such that the device 12 is configured to emit disabling light of a selectable intensity, duration, and/or pattern. An array of LEDs 22 is shown in FIG. 1, but is not reproduced in the other figures for simplicity, although it will be understood that other embodiments may also include the array of LEDs 22. Further, one non-limiting example of a light source 20 is shown in FIGS. 8 and 9. The at least one light source 20 of the device 12 is configured to generate light having an intensity of at least 100,000 lumens, and in one embodiment between approximately 100,000 lumens and approximately two million lumens, depending on the configuration of the area in which the device 12 will be used and the needs of the user. In one embodiment, each LED 22 is configured to generate light having an intensity of at least 10,000 lumens. In some embodiments, the at least one light source 20 additionally or alternatively includes at least one laser. Further, in one embodiment, the device 12 is configured to selectively deliver light in any of a variety of patterns from the LEDs 22. For example, the device 12 may be configured to deliver light in a widespread beam, a focused beam, or combination thereof, based on the delivery pattern of disabling light flashes that is being used. In one embodiment, the device 12 may deliver a random pattern of light flashes in a widespread beam or a focused beam, and in another embodiment the device 12 may deliver a sequence or combination of flashes of light in a widespread beam and a focused beam (such as alternating flashes of widespread beams and focused beams). Still further, in one embodiment the output of the LEDs 22 is controllable remotely such that a user may selectively adjust the intensity and/or pattern of light generated by the device 12. In one embodiment, at least a portion of the at least one light source 20 is exposed from the housing 18. In another embodiment, an entirety of the at least one light source 20 is entirely within the housing 18 and behind a lens, shield, or other translucent or transparent piece of material. The size, shape, and configuration of the housing 18 depends on the form of the device 12, such as the embodiments shown and described herein.

Continuing to refer to FIG. 1, the device 12 is configured to emit a pattern of disabling light flashes having a lumen output or brightness of approximately 100,000 or, in one embodiment, between approximately 100,000 lumens and approximately two million lumens. This intensity is sufficient to temporarily blind and disorient a target. For example, this brightness is sufficient to functionally blind a target for a period of between approximately 10 to approximately 30 seconds, with partial vision impairment lasting for up to a few minutes, but does not cause permanent visual or ocular damage. Thus, the device 12 is capable of temporarily disabling a target, but an authorized user wearing the synchronized eyewear 14 is protected and therefore unaffected by the disabling light flashes.

Continuing to refer to FIG. 1, in one embodiment, the device 12 also includes at least one sensor 24, processing circuitry 26, a communications controller 28, an identification module 30, a voltage source 31, and at least one power source 32 located at least partially within the housing 18 and/or coupled to the housing 18. In some embodiments, the device 12 also includes at least one still and/or video camera 34 located at least partially within the housing 18 and/or coupled to the housing 18. For simplicity, the at least one sensor 24, processing circuitry 26, communications controller 28, identification module 30, voltage source 31, at least one power source 32, and at least one camera 34 are referred to herein collectively as an operational unit 36. In some embodiments, some or all of the components of the operational unit 36 are included on one or more printed circuit boards. Further, it will be understood that these components may be in a configuration different than that shown in the figures and/or the component cluster 36 may include more or fewer components than are shown in the figures.

Continuing to refer to FIG. 1, in some embodiments, the at least one sensor 24 includes at least one of an audio sensor, smoke sensor, gas sensor (such as an oxygen sensor, carbon dioxide sensor, and/or carbon monoxide sensor), temperature sensor, and/or infrared sensor. In some embodiments a sensor 24 includes at least one associated component 38, in which case the sensor 24 and associated components may be referred to as a module 40. In one embodiment, the module 40 is an audio module that includes a microphone as the audio sensor 24 and a speaker as an associated component 38. In a non-limiting example of use of a device 12, an audio sensor 24 detects sound from an area surrounding the device 12, such as voices, screams, crowd noise, or gunshots, and transmits that sound data to the processing circuitry 26, which then compares the sound against a database of reference sounds, such as gunshot audio files saved within one or more components of the processing circuitry 26 (such as a memory) or in a local, remote, or cloud-based database that is accessible by the processing circuitry 26, to more accurately identify the sound. In one non-limiting example, a possible gunshot sound may be detected by the audio sensor 24 and transmitted to the processing circuitry 26, which then compares the possible gunshot sound to the database of reference gunshot sounds to positively identify the possible gunshot sound. Further, when a loud sound such as a gunshot (for example, a sound having a decibel level or volume of approximately 120 dB) is received by the processing circuitry 26 and the processing circuitry 26 compares and identifies the sound as a gunshot, the processing circuitry 26 communicates a potential emergency situation to a first responder and/or automatically activates the device 12 to create a random pattern of disabling light flashes. Thus, the system 10 uses situational and environmental analysis and response (SEAR) to automatically activate one or more devices 12 in certain circumstances. Further, if the device 12 includes an audio module 40 having a microphone 24 and speaker 38, a first responder or other user may send a voice message, warnings, and/or instructions to people in the room (including the targets and/or non-targets) through the speaker 38 of the audio module 40.

Continuing to refer to FIG. 1, in one embodiment the module 40 is a smoke sensor module that includes a smoke sensor as the sensor 24 and a laser or other light-emitting component as the additional component 38. In a non-limiting example of use of the device 12, a smoke sensor 24 detects the presence of smoke in an areas surrounding the device 12 and the smoke sensor 24 then transmits a signal to the processing circuitry 26, which in turn analyzes characteristics of the smoke, such as color and/or density, such as by comparing the smoke data to a reference database of smoke characteristics. If the device 12 is not already emitting disabling light flashes, in one embodiment the processing circuitry 26 automatically activates the device 12. Once the device 12 is activated (or if the device 12 is already activated), the processing circuitry 26 may modulate the frequency and/or brightness (lumen output) of the disabling light flashes produced by the at least one light source 20 of the device 12 based on the analysis of the smoke so that the disabling light flashes may adequately penetrate the smoke to have the desired effect on the targets. Further, if the device 12 includes the smoke sensor module 40, in one embodiment the processing circuitry 26 also automatically activates and/or modulates light emitted from the light-emitting component 38 for maximum smoke penetration (for example, increasing or decreasing the optical power per unit area of the laser or other light-emitting component 38). Additionally, light emitted from the light-emitting component 38 may be used to indicate to non-targets the way to an exit and/or a path to circumvent the smoke. In one example, the light-emitting component 38 is a laser source and includes diffractive optical elements configured to allow the light-emitting component 38 to emit a laser beam of light shaped as an arrow.

Figure 3:
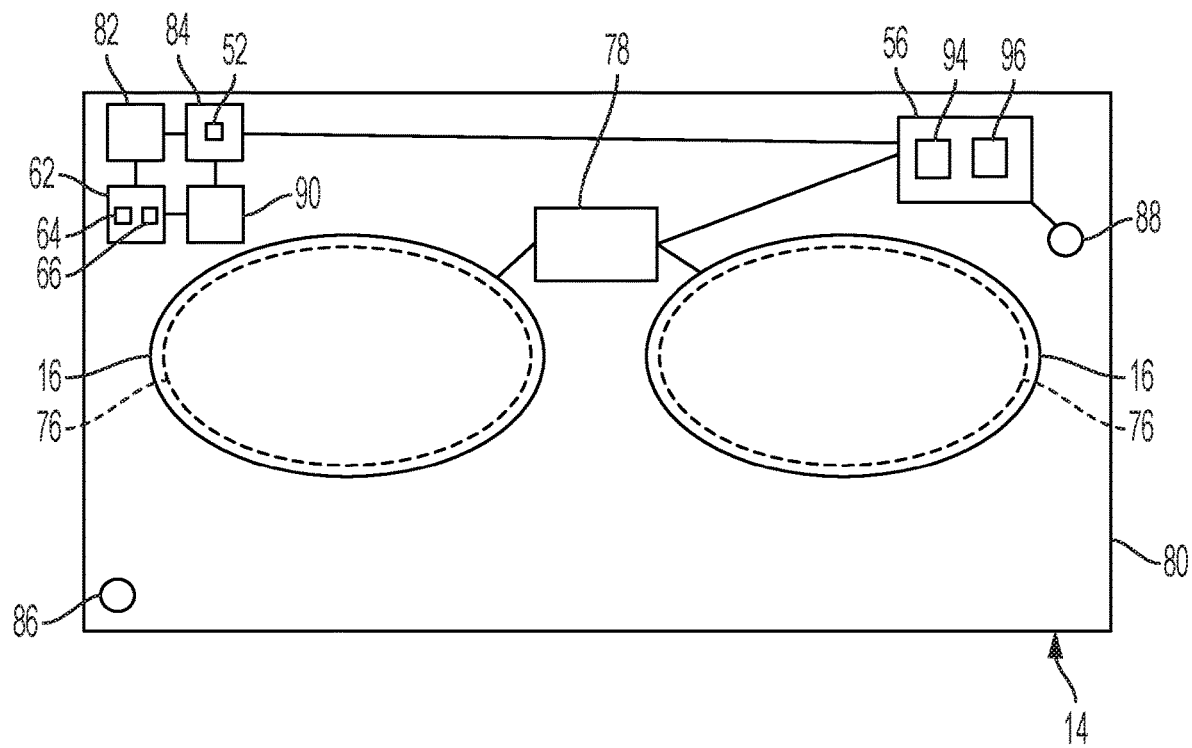
FIG. 3 shows a schematic diagram of exemplary protective eyewear of FIGS. 1 and 2, in accordance with the present disclosure.
Figure 6:
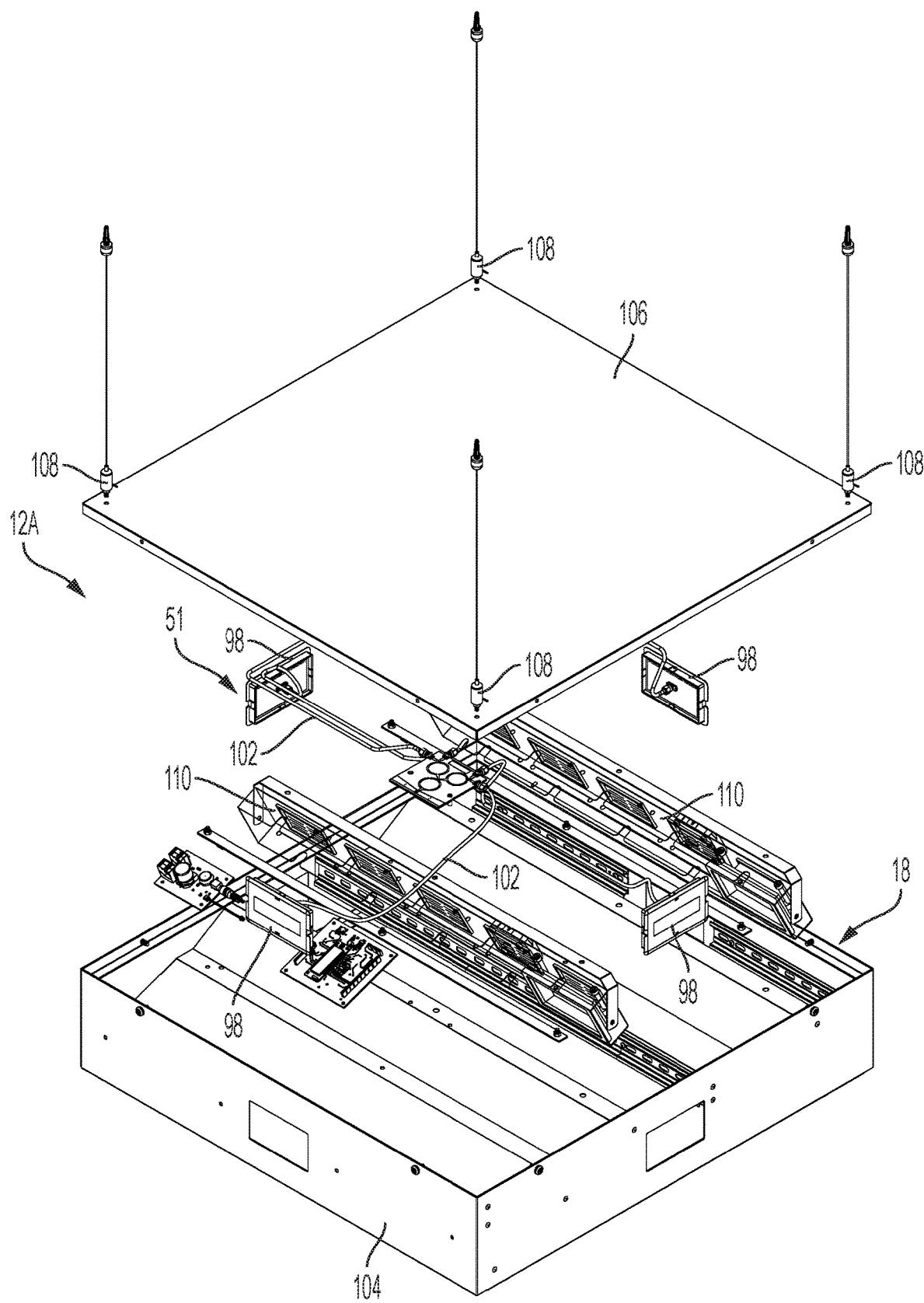
FIG. 6 shows an exploded perspective view of an exemplary embodiment of a light-emitting device configured as a light fixture, such as for use as a light-emitting device as part of a tactical lighting system, in accordance with the present disclosure.

Continuing to refer to FIG. 1, the processing circuitry 26 includes a processor 42 and a memory 44. The memory 44 is in electrical communication with the processor 42 and has instructions that, when executed by the processor 42, configure the processor 42 to perform the functions of the processing circuitry 26 discussed herein. In one non-limiting example, the processing circuitry 26 includes or is in communication with the communication controller 28 and includes a memory 44 has instructions that, when executed by the processor 42, configure the processor 42 to provide communications between the communication controller 28 and one or more other devices, such as eyewear 14, a remote server 46, a data storage medium 48 (incorporated within and/or external to the light-emitting device 12), or the like. In one embodiment, the communication controller 28 includes or is in communication with a transceiver 50 having a wireless communication unit. In one non-limiting embodiment, the transceiver 50 may be a transceiver assembly 51 (as shown in FIG. 6). The transceiver 50 wirelessly receives and transmits signals to and from a transceiver 52 (as shown in FIG. 3) in each of one or more items of eyewear 14 via a wireless communication technology such as radio, BLUETOOTH®, infrared, radiofrequency identification (RFID), LoRa®, ZIGBEE®, near field communication (NFC), WiFi, radiofrequency, or the like. Further, redundant communication technologies may be used. It is understood that implementations are not limited to only these technologies and that any wireless communication technology suitable for short- or long-range communications can be used. Further, in some embodiments the transceiver 50 of the communication controller 28 of the device 12 wirelessly receives and transmits signals to and from a transceiver in each of one or more other communications devices used by first responders, data storage devices, computers, or the like to enable the light-emitting device to communicate information about an emergency (or other) situation in real time and/or at a later time.

Continuing to refer to FIG. 1, the processing circuitry 26 is in communication with the at least one light source 20 and controls the activation of the device 12 and pattern of the disabling light flashes emitted by the at least one light source 20. In one embodiment, the processing circuitry 26 further includes a random seed generator 54 for generating a random sequence or pattern of disabling light flashes (referred to as the "random pattern"). Thus, the random pattern is or may be different every time the device 12 is activated. In one non-limiting example, a random pattern may include an "on" period of three rapid pulses followed by an "off" period that is less than the "on" period. In another non-limiting example, a random pattern may include rhythmic, regular flashes of disabling light in which the "on" period and the "off" period have the same duration. In another non-limiting example, successive "on" and "off" periods may have random durations with no perceivable pattern. As is discussed in greater detail below, a digital handshake is performed between the processing circuitry 26 of the device 12 and the processing circuitry 56 of each of one or more items of protective eyewear 14, and the random pattern generated by the random seed generator 54 is communicated (such as by an encrypted radio signal) to each of the items of eyewear 14. Thus, only recognized items of eyewear 14 are authorized to receive, and synchronize with, the random pattern emitted by the device 12. This prevents unauthorized items of eyewear 14, such as counterfeit devices used by targets, from synchronizing with the processing circuitry 26 of the device 12 and receiving protection from the random pattern of disabling light flashes.

Figure 2:
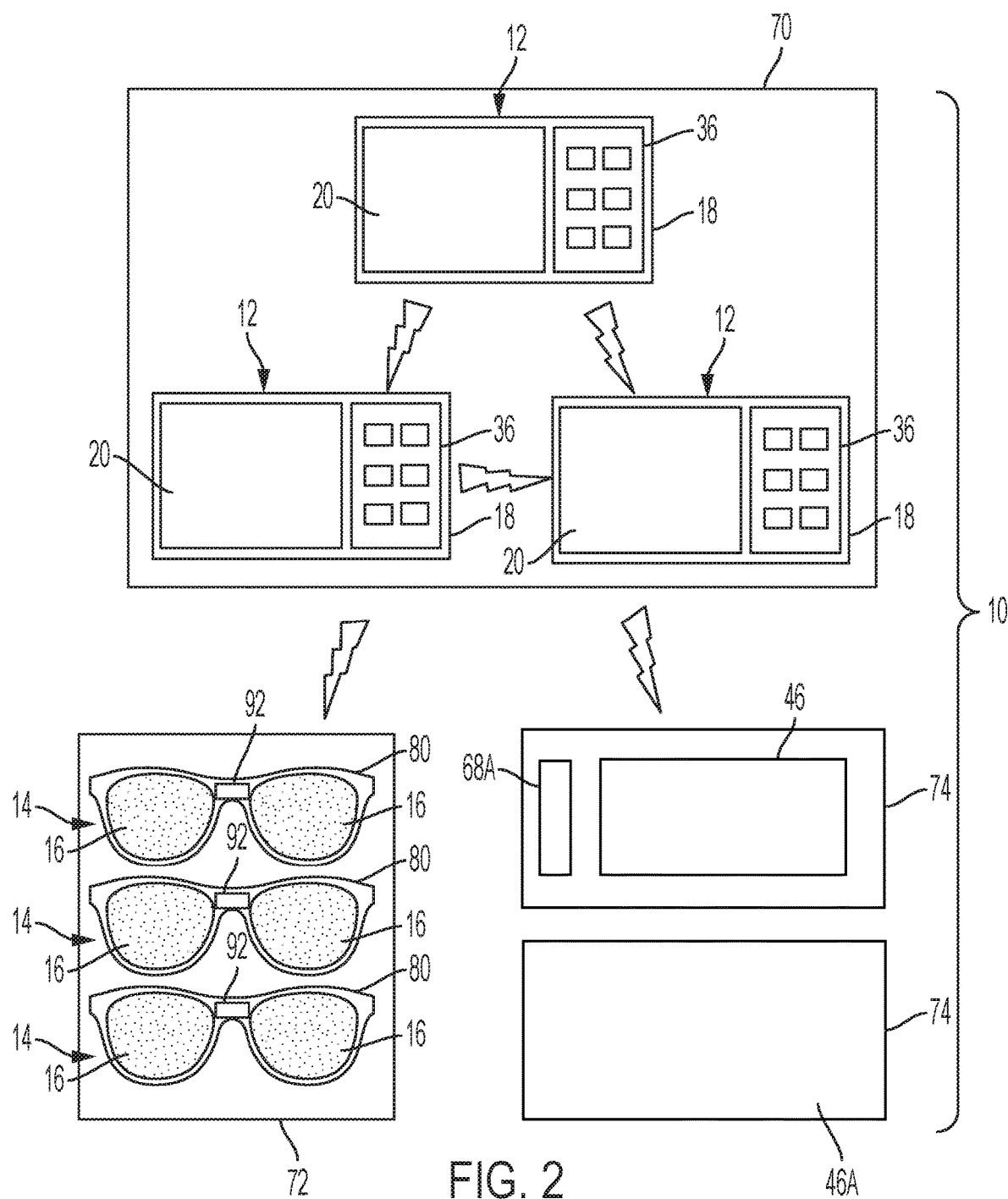
FIG. 2 shows a schematic diagram of a further exemplary embodiment of the tactical lighting system, in accordance with the present disclosure.

Continuing to refer to FIG. 1, in some embodiments the processing circuitry 26 is configured to receive signals or other data from more than one sensor 24 and/or sensor module 40, and to use this data to generate a combined analysis, cause a change in the system 10 (for example, to automatically activate the device 12), and/or to send an alert or communicate information to a remote server 46 (for example, as shown in FIG. 2) and/or to a first responder (such as through 911 and/or similar channels of emergency communication). That is, in one embodiment the processing circuitry 26 may be configured to perform real-time as well as offline data analysis from a plurality of sensors 24/sensor modules 40. In one non-limiting example, the processing circuitry 26 uses data from a gas sensor 24, temperature data from a temperature sensor 24, and data from a smoke sensor 24 to determine the chemical nature of the smoke and to inform first responders so they may use the appropriate personal protective equipment, gas filters, respiratory systems, or the like. In another non-limiting example, the processing circuitry 26 uses data from the audio sensor 24 (such as the presence of gunshots) as well as data from an infrared sensor 24 to determine the location of a target relative to the device 12.

Continuing to refer to FIG. 1, in one embodiment the device 12 also includes an identification module 30 that includes a recognition component 58 and, optionally, an authorization component 60. In one embodiment, the recognition component 58 is an RFID reader in communication with the processing circuitry 26 and the authorization component 60 is an RFID tag (that is, a component that enables a recognition component of another light-emitting device 12 or other device to identify and authorize the device 12 for communication). As discussed in detail below and shown in FIG. 3, each item of eyewear 14 also includes an identification module 62 that includes a recognition component 64 (such as an RFID reader) and an authorization component 66 (such as an RFID tag). The recognition component 58 of the device 12 is configured to identify one or more items of protective eyewear 14 (such as by recognizing the authorization component 66 of the eyewear 14) and authorizes those item(s) of eyewear 14 for communication with the device 12 and synchronization with the random pattern. Further, it will be understood that the technology used for recognition and authorization by the device 12 (such as the identification module 30) may additionally or alternatively be radio, Bluetooth, infrared, LoRa, Zigbee, near field communication (NFC), WiFi, radiofrequency and/or other technology suitable for this purpose. In some embodiments, an authorized device such as an item of protective eyewear 14 may be remotely deactivated by a system operator/administrator, first responder, law enforcement station, security personnel, web server, or the like.

Continuing to refer to FIG. 1, the at least one power source 32 includes a native power source, at least one primary battery, and/or at least one backup battery in communication with the processing circuitry 26 and the at least one light source 20, and optionally other system components such as sensor(s) 24, camera(s) 34, and the like. In one non-limiting example, the at least one power source 32 is a native power source such as an electrical system within a home or other building that is in communication with a local power grid and which delivers, for example, 90V to 300V power (in one embodiment, 110V power), depicted in FIGS. 6, 7, and 10 with reference number 32A. For example, in some embodiments the device 12 is configured to be plugged into an electrical outlet or otherwise connected to the electrical system of the building (native power source) 32A. Additionally or alternatively, the device 12 includes at least one primary battery 32 within the housing 18, such as if the device 12 is a wireless device. Further, in some embodiments the device 12 also includes at least one backup battery so the device 12 does not lose power if the at least one primary battery 32 dies and/or in the event of a blackout or if the native power source 32A is disabled. In some embodiments the at least one primary battery 32 and/or the at least one backup battery are rechargeable and may be charged using trickle charging. Thus, even if a plurality of devices 12 are used, they will not overload the circuit while charging.

Continuing to refer to FIG. 1, in one embodiment the device 12 includes a manual activation mechanism 68, such as an on/off switch or button (shown in FIG. 1), a remote control (depicted in FIG. 2 with reference number 68A and shown in greater detail in FIG. 16), or the like that allows for manual activation of the device 12, such as by a teacher, security personnel, first responder, or other authorized system operator/administrator. In some embodiments, the manual activation mechanism 68 includes an authorization component, such as a fingerprint reader, RFID reader/tag system, or the like to prevent targets or other unauthorized users from manually activating or deactivating the device 12.

Continuing to refer to FIG. 1, the at least one still and/or video camera 34 is located at least partially within the housing 18 and/or is coupled to or located proximate the housing 18. Each of the camera(s) 34 is in communication with the processing circuitry 26 and is configured to transmit image and/or video data to the processing circuitry 26 and/or to a remote server 46, first responder, or other authorized system operator/administrator for real-time and/or offline viewing and/or storage. Optionally, at least one camera 34 may include fixed or removable flash memory as a storage medium for video and/or image data for later viewing and analysis. Further, in one embodiment the camera(s) 34 transmit live video and/or audio to first responders, law enforcement, security personnel, and/or or other authorized system operator/administrators to aid situation assessment and/or monitoring.

Referring now to FIG. 2, a schematic diagram of a further exemplary embodiment of a tactical lighting system 10 is shown. The tactical lighting system 10 of FIG. 2 includes a plurality of light-emitting devices 12 (collectively referred to as a light-emitting device network 70), a plurality of items of protective eyewear 14 (collectively referred to as a protective eyewear group 72), and one or more control, communication, and/or storage devices (collectively referred to as connected devices 74). In one non-limiting example, the light-emitting device network 70 is in wired and/or wireless communication with the connected devices 74, and the connected devices 74 include one or more remote controls 68A, one or more remote servers 46, and/or one or more communication networks (such as 911, first responder station, cell phone networks, data storage devices/media, communication units, radios, walkie-talkies, speakers, or headphones, or the like). Each device 12 and each item of eyewear 14 shown in FIG. 2 are as shown and described in FIGS. 1 and 3-5, and therefore the details of which are not discussed regarding FIG. 2 for the sake of brevity.

Continuing to refer to FIG. 2, the devices 12 of the light-emitting device network 70 are in wireless and/or wired communication with each other. Thus, in one embodiment a random pattern is generated by a random seed generator 54 of only one device 12 and that random pattern is transmitted to other devices 12 in the light-emitting device network 70 so that all devices 12 in the light-emitting device network 70 emit an identical pattern of disabling light flashes. Additionally or alternatively, each device 12 may be located in a different room or area of a building and the random seed generator 54 of each device 12 generates a different random pattern. In this configuration, eyewear 14 may be paired and synchronized with only the device 12 with which the eyewear is in communication 14 (that is, identified and authorized). As the user moves from room to room, the eyewear 14 may disconnect from a first device 12 (that is, become unauthorized) and reconnect to (that is, be identified and authorized by) a second device 12 that is in the new area into which the user has moved.

Continuing to refer to FIG. 2, each device 12 transmits and/or receives sensor data to and from each other and/or to the protective eyewear group 72 and/or the connected devices 74. Thus, the light-emitting device network 70 is configured to gather and transmit data from a plurality of sensors 24, and this data are used by the processing circuitry 26 of one or more devices 12 of the light-emitting device network 70 and/or by a connected device such as a remote server, computer, or storage media for analysis and determination of an overall emergency situation that can be used by non-targets such as first responders in real time to better understand the emergency situation before entering a building or searching for non-targets and/or by law enforcement officers and forensics experts after the emergency situation is over to determine a target's actions, fire source, or the like.

Continuing to refer to FIG. 2, two or more devices 12 within the light-emitting device network 70 combine sensor data to create a data array that can allow the system 10 to react to environmental and situational circumstances. All data collected from the devices 12 in the light-emitting device network 70 are combined to allow for a better analysis of an emergency situation. In one exemplary method of use, if one light-emitting device 12 detects a gunshot in one location within a building (such as with an audio sensor 24), data are transmitted between all devices 12 in the light-emitting device network 70, and the processing circuitries 26 triangulate the location of the target shooter and communicate that location to first responders or law enforcement. Such data may be used in real time and/or after the emergency situation is over as part of an investigation to make determinations such as how fast shots were fired, how quickly the target/suspect moved through the building, the target's/suspect's entry and/or exit point, and the like. It will be understood that such analyses may be performed by at least one processing circuitry 26 of the light-emitting device network 70 and/or a processor of a connected device 74.

Continuing to refer to FIG. 2, in another exemplary method of use, data about smoke and/or fire gathered by the sensors of the light-emitting devices 12 are transmitted to the processing circuitries 26 of the light-emitting device network 70 for analysis and determination of emergency situation characteristics, such as the location of the origin of a fire, direction and speed of fire propagation, and the location of non-targets within the smoke and relative to the fire (SEAR). For example, in one embodiment data collected by each device 12, such as from temperature sensors, infrared sensors, smoke sensors, and/or gas sensors, are compared between devices 12 to determine directions (such as of fire), trends (such as of temperature increases), locations (such as of non-targets trapped inside the building), intensities (such as of fire, temperature, and smoke), densities (such as of smoke), and the like. Additionally, in one embodiment the processing circuitries 26 of the devices 12 are configured to compare data from an oxygen sensor of a light-emitting device 12 in one room to data from an oxygen sensor of a light-emitting device 12 in another room to calculate oxygen differential, which can be used by first responders (such as firefighters or law enforcement) to determine the risk of backdraft. Such data may be used in real time and/or after the emergency situation is over as part of an investigation. For example, during an investigation data from temperature sensor(s), smoke sensor(s), infrared sensor(s), or other sensor(s) 24 may be used to determine where a fire originated, how hot the fire burned, the fire's burn path, percentages of oxygen and other gases during the fire at different locations within the building, and the like. Further, such factors may help firefighters and investigators determine the materials that were burned. It will be understood that such analyses may be performed by at least one processing circuitry of the light-emitting device network 70 and/or a processor of a connected device 74.

Continuing to refer to FIG. 2, in one embodiment the connected devices 74 include at least one remote control 68A for manually activating or deactivating the system 10. For example, the remote control 68A may be used to manually and selectively activate or deactivate one or more light-emitting devices 12 or the entire light-emitting device network 70, as well as one or more items of protective eyewear 14 or the entire protective eyewear group 72 (such as in cases where it is desired to override the automatic activate of one or more items of eyewear 14 or if automatic activation of the eyewear 14 fails). In one embodiment, a remote control 68A may be used by a teacher or security personnel to manually and immediately activate the system 10. In another embodiment, a remote control 68A may be used by a teacher or other non-target to trigger an alarm, which alerts security personnel, law enforcement, first responders, or the like. This alarm may be confirmed or overridden by the security personnel, law enforcement, first responders or the like within a predetermined period of time (for example, 10 seconds). Further, the system 10 may be configured such that the system 10 will automatically activate if the alarm is not confirmed or overridden within the predetermined period of time. In one embodiment, each remote control 68A includes biometric security, such as face or voice recognition, fingerprint reader, or the like to prevent use by unauthorized users. Continuing to refer to FIG. 2, a connected device 74 such as a remote server or computer 46 may be configured to control the system 10 (including the light-emitting device network 70 and/or the protective eyewear group 72). In one embodiment, the remote server or computer 46 may be accessible only by authorized users, such as law enforcement, first responders, security personnel, or other authorized system operator/administrator. Further, in one embodiment the remote server or computer 46 can authorize and de-authorize any device 12 or item of eyewear 14 of the system 10. Thus, the remote server or computer 46 may provide an additional level of safety if, for example, a target manages to obtain and authorize an item of eyewear 14. Still further, in one embodiment the remote server or computer 46 communicates with the light-emitting device network 70, the protective eyewear group 72, and/or other connected devices 74 to monitor status, charge, and/or functionality (such as by running diagnostics) of each component of the system 10. For example, an authorized system operator/administrator is able to monitor all device(s) 12, item(s) of eyewear 14, and, in some embodiments, connected devices 74 to make sure all components are active and ready, if one or more components are triggered or activated, manually activate or deactivate component(s), etc. The remote server or computer 46 that permits such access may be referred to as a Tier 1 server. In some embodiments, the system 10 also includes or is in communication with a second remote server or computer 46A, which may be referred to as a Tier 2 server, that is accessible by an authorized operator/administrator who performs monitoring and administrative functions, such as diagnostics, firmware and software upgrades, or the like. An authorized operator/administrator of the Tier 2 server 46A may also be permitted to perform the same functions as an authorized operator/administrator of the Tier 1 server 46.

Figure 4:
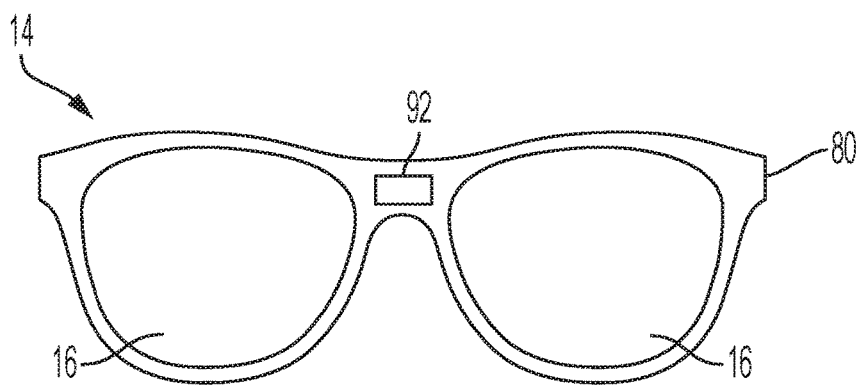
FIG. 4 shows an exemplary embodiment of protective eyewear in a first state, such as for use as part of a tactical lighting system, in accordance with the present disclosure.
Figure 5:
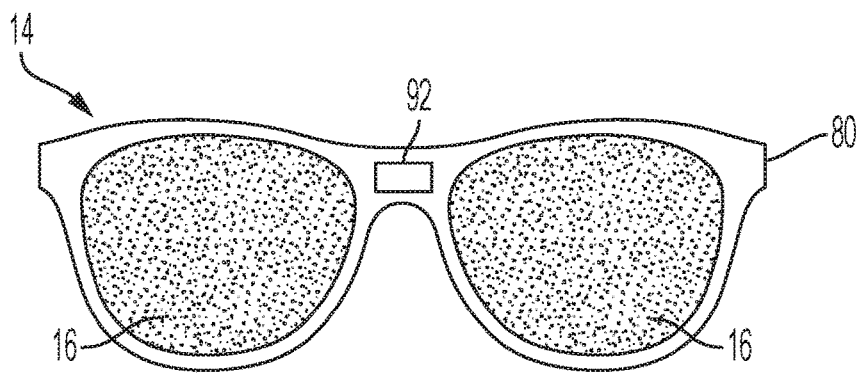
FIG. 5 shows the protective eyewear of FIG. 4 in a second state, in accordance with the present disclosure.

Referring now to FIGS. 3-5, the exemplary protective eyewear 14 of FIGS. 1 and 2 is shown in greater detail. FIG. 3 shows a schematic diagram of exemplary eyewear 14, FIG. 4 shows the exemplary eyewear 14 in a first state in which the lenses 16 are in a clear or transparent state, and FIG. 5 shows the exemplary eyewear 14 in a second state in which the lenses 16 are in a darkened or opaque state. Although two lenses 16 are shown in FIGS. 3-5, in some embodiments the eyewear 14 alternatively includes one large lens, such as when the protective eyewear is, or is incorporated into, a helmet or eye shield. Further, it will be understood that the eyewear 14 may be synchronized with multiple devices 12 if those devices 12 are emitting the same pattern of flashing disabling light.

Referring now to FIG. 3, and with reference to FIGS. 4 and 5, in one embodiment, the eyewear 14 includes active shutter lens(es) 16. In one embodiment, each lens 16 includes a liquid crystal layer 76 that is clear (translucent or transparent), but becomes darkened or opaque when voltage is applied to the liquid crystal layer 76 from a voltage source 78. The eyewear 14 is shown in a first or transparent/translucent state in FIG. 4 and in a second or darkened/opaque state in FIG. 5. When the lens(es) 16 are in the darkened/opaque state, the disabling light flash does not pass through the lens(es) 16 and the wearer's eyes are protected. The voltage source 78 is controlled by an electrical timing signal, such as a signal received wirelessly from a random seed generator 54 of a light-emitting device 12 that is transmitted as an encrypted radio signal. The application of voltage to the shutter lens(es) 16 is timed such that voltage is delivered, and the lenses 16 turn opaque, when a device 12 to which the eyewear 14 is synchronized emits a flash of disabling light. Similarly, the voltage is not delivered, and the lenses 16 are transparent/translucent, when the device 12 is not emitting a flash of disabling light. Thus, the shuttering pattern of the eyewear 14 is synchronized with (or corresponds and is identical to) the random pattern of disabling light flashes emitted by the device 12. Transition between the first and second states occurs very quickly, such as, in one embodiment, within approximately 50 milliseconds. This transition is less than half the time it takes to blink an eye and thus the transition is not perceived by and does not disrupt normal vision of the wearer. However, it will be understood that different transition times may be used. As discussed above, the eyewear 14 may be synchronized to all devices 12 of a light-emitting device network 70 (for example, when all devices 12 are emitting an identical pattern of disabling light flashes) or to only one or fewer than all devices 12 of a light-emitting device network 70 (for example, when devices 12 of a light-emitting device network 70 are emitting different patterns of disabling light flashes).

Continuing to refer to FIG. 3, and with reference to FIGS. 4 and 5, in one embodiment the eyewear 14 also includes a housing 80, at least one sensor 82, processing circuitry 56, a communications controller 84, an identification module 62, a status LED 86, a manual activation mechanism 88, and a power source 90 located at least partially within the housing 80 and/or coupled to the housing 80. For simplicity, the at least one sensor 82, processing circuitry 56, communications controller 84, identification module 62, status LED 86, manual activation mechanism 88, power source 90, voltage source 78, and other internal components are referred to herein collectively as an operational unit 92, and are depicted as such in FIGS. 1, 2, 4, and 5. It will be understood that these components may be in a configuration different than that shown in the figures and/or the component cluster 92 may include more or fewer components than are shown in the figures. In one embodiment, the at least one sensor 82 includes one or more of the sensors 24 discussed above regarding the light-emitting device 12. Additionally or alternatively, in one embodiment the sensor 82 includes a light sensor configured to allow the eyewear 14 to at least partially shutter in synchronization with a light-emitting device 12 according to sensed flashes of light, which may provide at least some protection to an authorized user if the wireless communication and transmission of the random pattern is disabled or prevented.

Continuing to refer to FIG. 3, the processing circuitry 56 of the protective eyewear 14 includes a processor 94 and a memory 96. The memory 96 is in electrical communication with the processor 94 and has instructions that, when executed by the processor 94, configure the processor 94 to perform the functions of the processing circuitry 56 discussed herein. In one non-limiting example, the processing circuitry 56 is in communication with the voltage source 78 and includes a memory 96 that has instructions that, when executed by the processor 94, configure the processor 94 to receive a signal including a random pattern from a light-emitting device 12 and to apply and remove voltage from the shutter lens(es) 16 through the voltage source 78 to cause the shutter lens(es) 16 to transition between the first state and the second state in synchronization with the random pattern of disabling light flashes emitted by the device 12. In another non-limiting example, the processing circuitry 56 includes or is in communication with the communication controller 84 and includes a memory 96 has instructions that, when executed by the processor 94, configure the processor 94 to provide communications between the communication controller 84 and one or more other devices or system components, such as light-emitting device(s) 12, a remote server 46, a data storage device/medium 48, or the like. In one embodiment the communication controller 84 includes a transceiver 52 having a wireless communication unit. The transceiver 52 wirelessly receives and transmits signals to and from a transceiver 50 in each of one or more light-emitting devices 12 via a wireless communication technology such as radio, Bluetooth, infrared, radiofrequency identification (RFID), LoRa, Zigbee, near field communication (NFC), WiFi, radiofrequency or the like. Further, redundant communication technologies may be used. It is understood that implementations are not limited to only these technologies and that any wireless communication technology suitable for short- or long-range communications can be used. Further, eyewear 14 does not permanently store the random pattern(s) received by a device 12, but may be configured to temporarily store the random pattern(s) such that the processing circuitry 56 is configured to maintain synchronization with the device 12 even if the random pattern signal is not received from the device 12. Thus, continuous communication between the device 12 and the protective eyewear 14 is not required for protection of the wearer.

Continuing to refer to FIG. 3, in one embodiment the eyewear 14 includes an identification module 62 that includes a recognition component 64 and an authorization component 66. In one embodiment, the recognition component 64 is an RFID reader in communication with the processing circuitry 56 and the authorization component 66 is an RFID tag (that is, a component that enables the recognition component of a light-emitting device 12 to identify and authorize the eyewear 14 for communication and synchronization). The recognition component 58 of the device 12 may identify the authorization component 66 of one or more items of eyewear 14 and authorize those item(s) of eyewear 14 for communication and synchronization with the random pattern of disabling light flashes. Further, it will be understood that the technology used for recognition and authorization by the device 12 (such as the identification module 30) of the eyewear 14 may additionally or alternatively be radio, Bluetooth, infrared, LoRa, Zigbee, near field communication (NFC), WiFi, radiofrequency, and/or other technology suitable for this purpose.

Continuing to refer to FIG. 3, in some embodiments the light-emitting device(s) 12 (and/or connected device(s) 74) may "lock" the eyewear 14 to a particular location once the eyewear 14 is authorized and paired with the device(s) 12 (and/or connected device(s) 74). Thus, if the eyewear 14 is authorized at a first location, the eyewear 14 will not necessarily be authorized at a second location, unless or until device(s) 12 at the second location identify and authorize the eyewear 14. Thus, for example, an item of eyewear 14 that is authorized for use at a school may not be authorized for use at a mall. However, in some embodiments, an item of eyewear 14 may be configured for universal authorization at all locations. For example, eyewear 14 used by law enforcement officers or firefighters may be universally authorized, and use of the eyewear 14 by anyone else may be prevented by, for example, incorporation of biometric, password, and/or other security authorization means in the eyewear 14.

Continuing to refer to FIG. 3, the eyewear 14 is in communication with a remote server or computer 46 or 46A to enable an authorized user (such as law enforcement, first responders, security personnel, or other authorized system operator/administrator) to remotely de-authorize an item of eyewear 14, such as if the eyewear 14 is lost or stolen by a target or unauthorized user. As the random pattern received by the device(s) 12 is not stored or is only temporarily stored by the eyewear 14, stolen items of eyewear 14 will not work (cannot be authorized and paired) because the device(s) 12 will identify them as stolen/unauthorized before the device(s) 12 transmit the random pattern to the eyewear 14.

Additionally, the random pattern cannot be determined or reverse engineered from a stolen item of eyewear 14. In one embodiment, the status LED 86 is configured to blink and/or glow in different colors to indicate the authorization/pairing, charging, and/or other status of the eyewear 14. In one non-limiting example, the status LED 86 will steadily glow red if authorization/pairing is unsuccessful, will steadily glow blue if authorization/pairing is successful, and may blink red if the battery/power source 90 is low and needs to be recharged. Thus, a wearer can confirm that the eyewear 14 is authorized and paired before the random pattern of light flashes is emitted by the device 12. In one embodiment, the power source 90 is a rechargeable battery with the housing 80, and the housing 80 includes a charging port and/or inductive charging components. In one embodiment, the housing 80 is sized and shaped to resemble sunglasses or two-lensed goggles. In other embodiments, however, the housing 80 may be sized and shaped to substantially cover a user's face, to retain a single shield-style lens, or to be otherwise adapted for an intended use.

Continuing to refer to FIG. 3, in one embodiment, the manual activation mechanism 88 is an on/off switch or button that allows for the manual activation of the eyewear 14, such as by a teacher security personnel, first responder, or other authorized system operator/administrator. In some embodiments, the manual activation mechanism 88 includes an authorization component, such as a fingerprint reader, RFID reader/tag system, or the like to prevent targets or other unauthorized users from manually activating or deactivating the eyewear 14.

Figure 8:
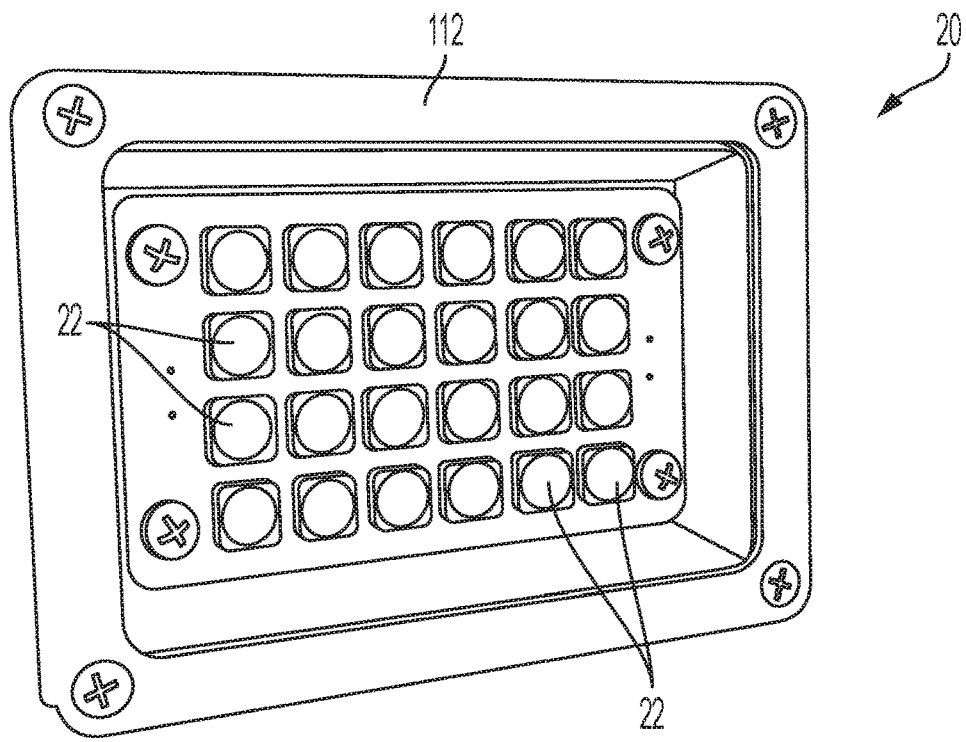
FIG. 8 shows a front perspective view of an exemplary light source of the light-emitting device of FIG. 6, in accordance with the present disclosure.
Figure 9:
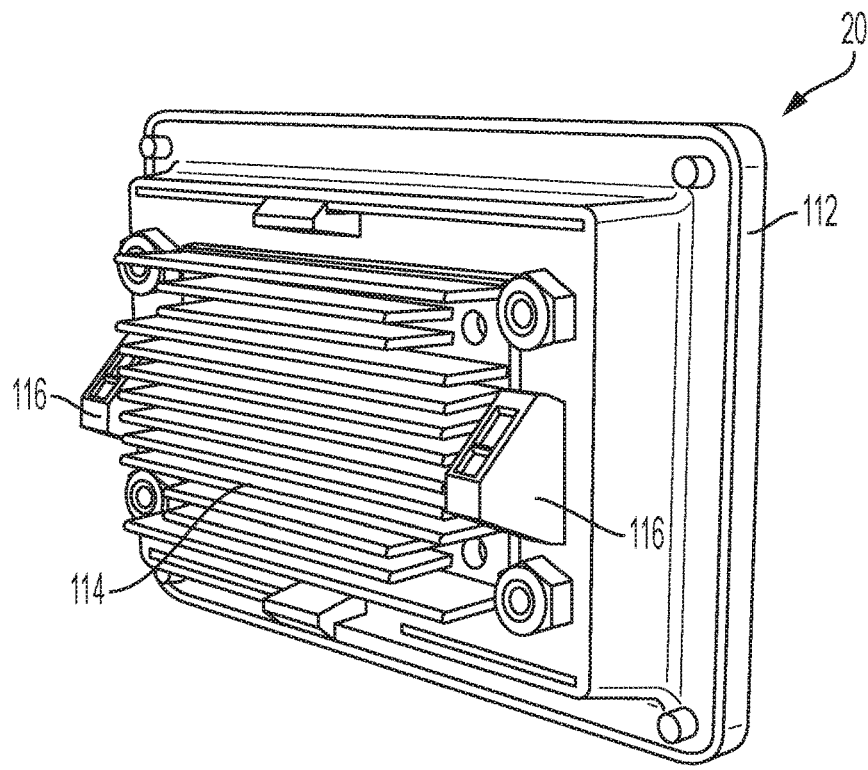
FIG. 9 shows a rear perspective view of the exemplary light source of FIG. 8, in accordance with the present disclosure.
Figure 10:
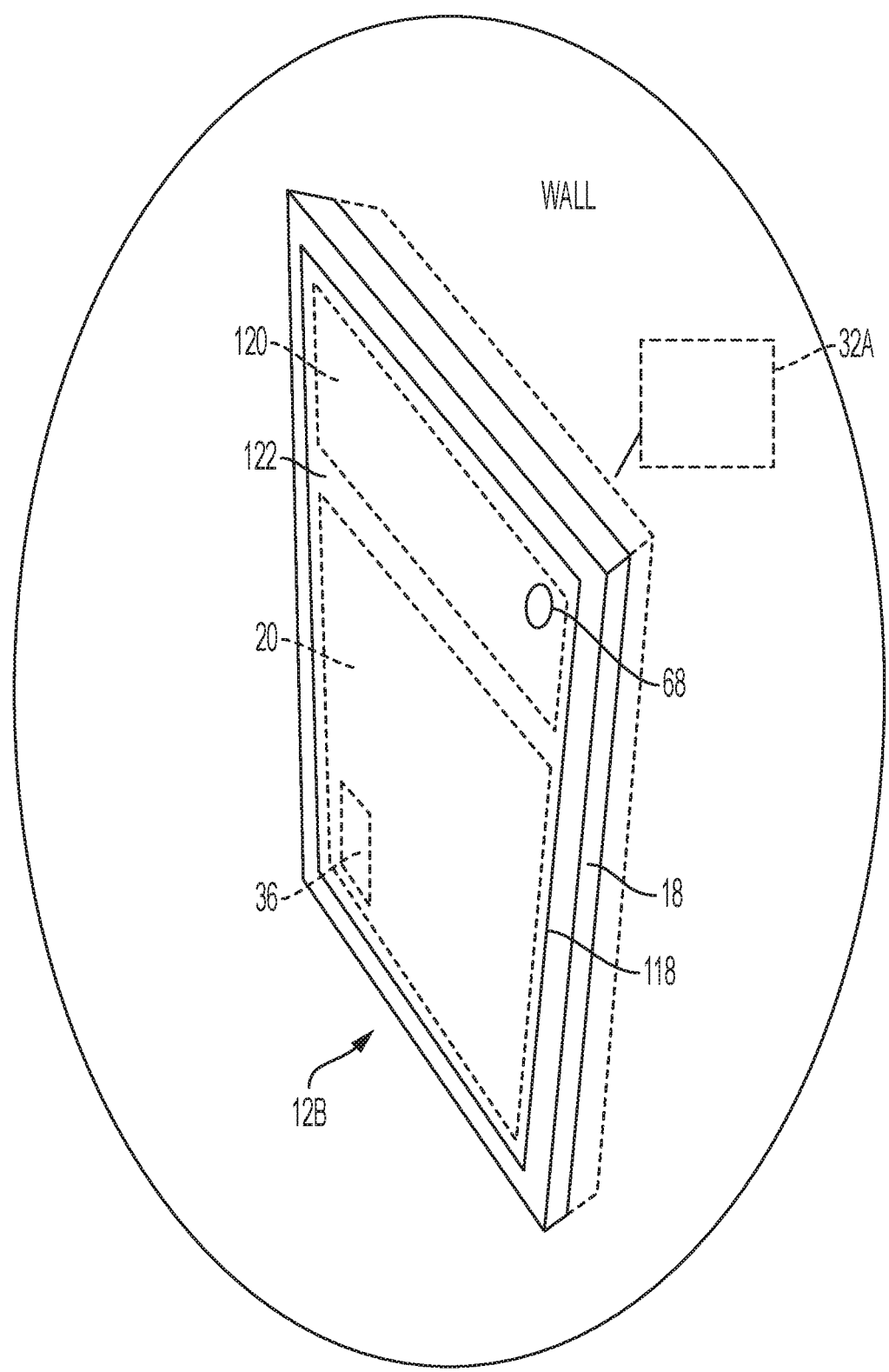
FIG. 10 shows a simplified view an exemplary embodiment of a light-emitting device configured as a concealed light fixture with control panel, such as for use as a light-emitting device as part of a tactical lighting system, in accordance with the present disclosure.
Figure 11:
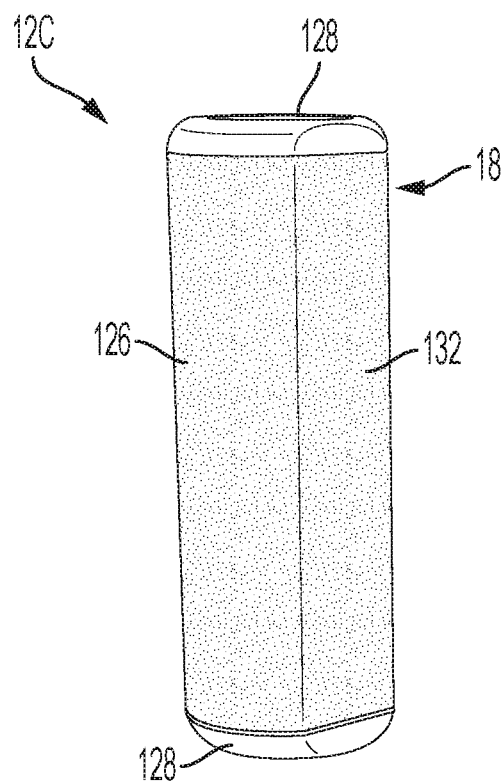
FIG. 11 shows an exemplary embodiment of a light-emitting device configured as a stun grenade, such as for use as a light-emitting device as part of a tactical lighting system, in accordance with the present disclosure.
Figure 12:
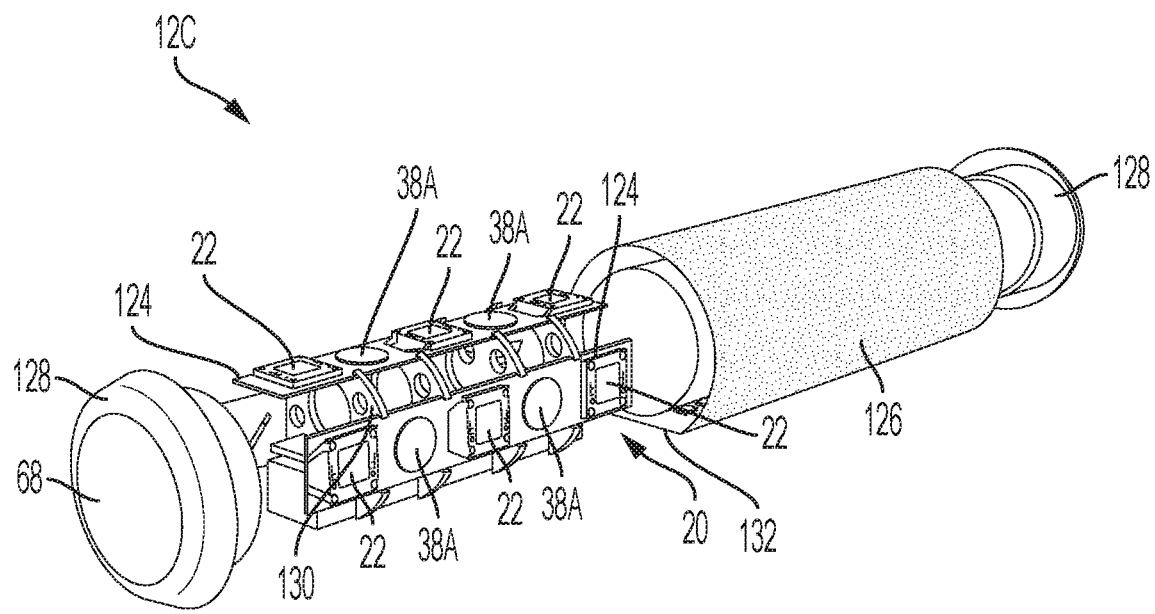
FIG. 12 shows internal components of the light-emitting device of FIG. 11 at least partially exposed for illustration, in accordance with the present disclosure.
Figure 13:
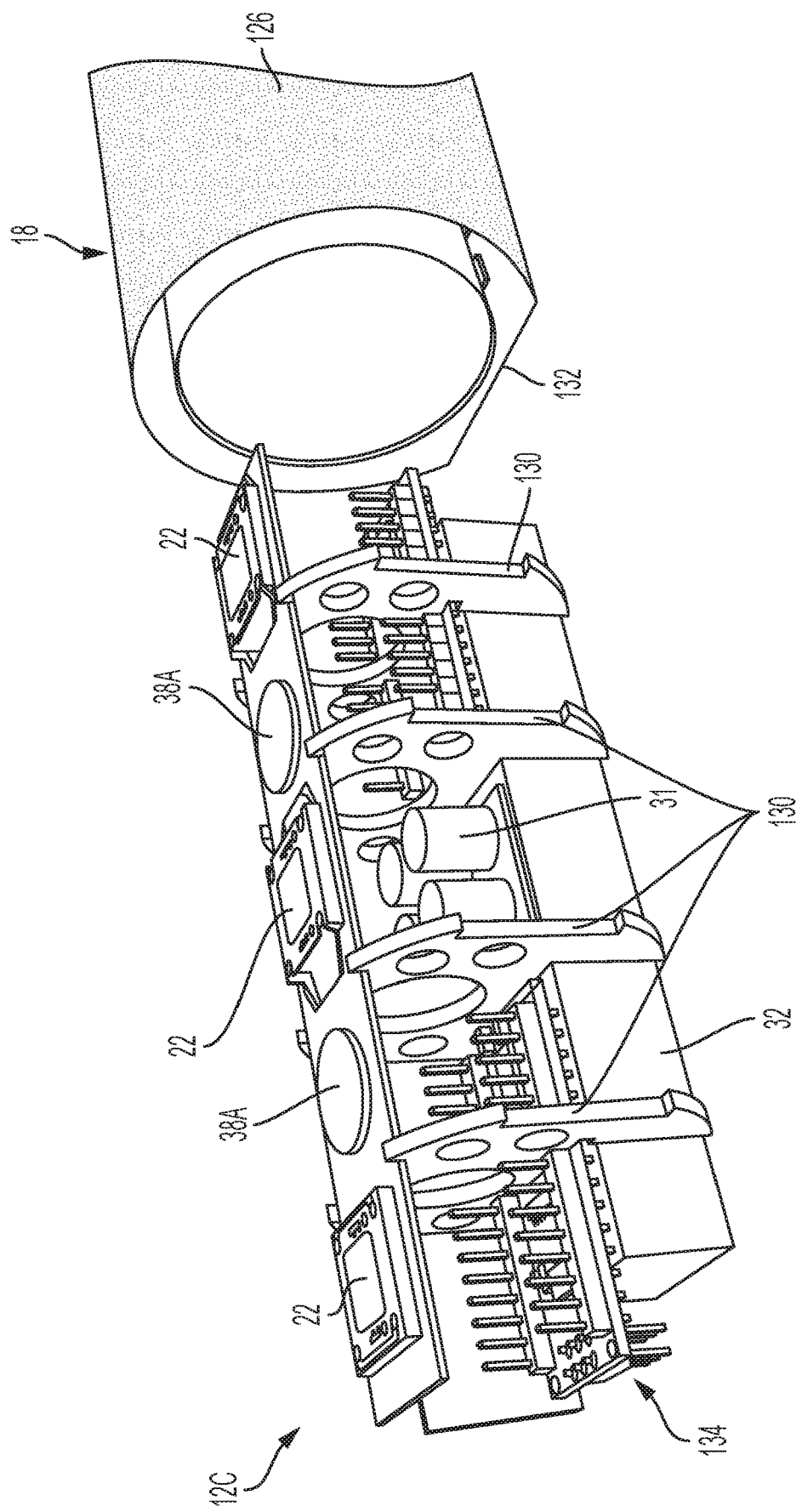
FIG. 13 shows a further view of the internal components of the light-emitting device as in FIG. 12, in accordance with the present disclosure.
Figure 14:
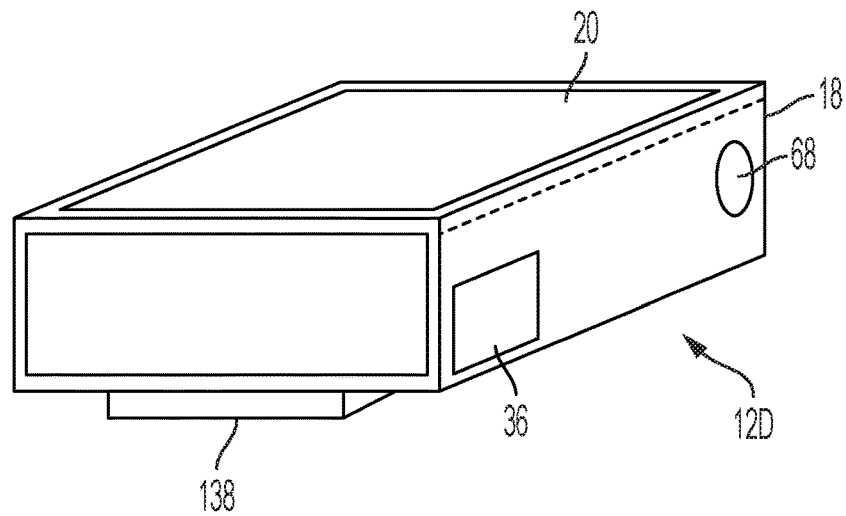
FIG. 14 shows a simplified view of an exemplary embodiment of a light-emitting device configured as a removably attachable light-emitting device, such as for use as a part of a tactical lighting system, in accordance with the present disclosure.
Figure 15:
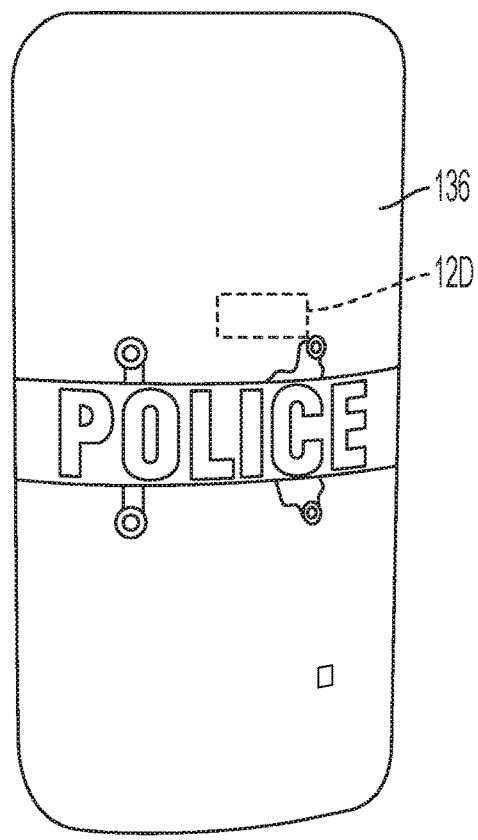
FIG. 15 shows a simplified view of the exemplary embodiment of the light-emitting device of FIG. 14 attached to a riot shield, in accordance with the present disclosure.

Referring generally now to FIGS. 6-15, exemplary embodiments of light-emitting devices 12 are shown. FIGS. 6-9 show a device 12A configured as a light fixture; FIG. 10 shows a device 12B configured as a concealed light fixture; FIGS. 11-13 show a device 12C configured as a stun grenade; and FIGS. 14 and 15 show simplified views of a device 12D configured to be removably attachable, such as to a vest, shield, or other piece of equipment. Although some particular details of each embodiment are discussed below, it will be understood that unless otherwise noted, all features discussed above regarding FIGS. 1 and 2 apply to the embodiments of FIGS. 6-15. For example, in some embodiments each device 12A, 12B, 12C, 12D shown in FIGS. 6-15 includes the sensors 24 and/or sensor modules 40, processing circuitry 26, communications controller 28, identification module 30, camera(s) 34, transceiver 50, random seed generator 54, and other components shown and described in the schematic configurations of FIGS. 1 and 2, and are configured to be operated as disclosed above.

Figure 7:
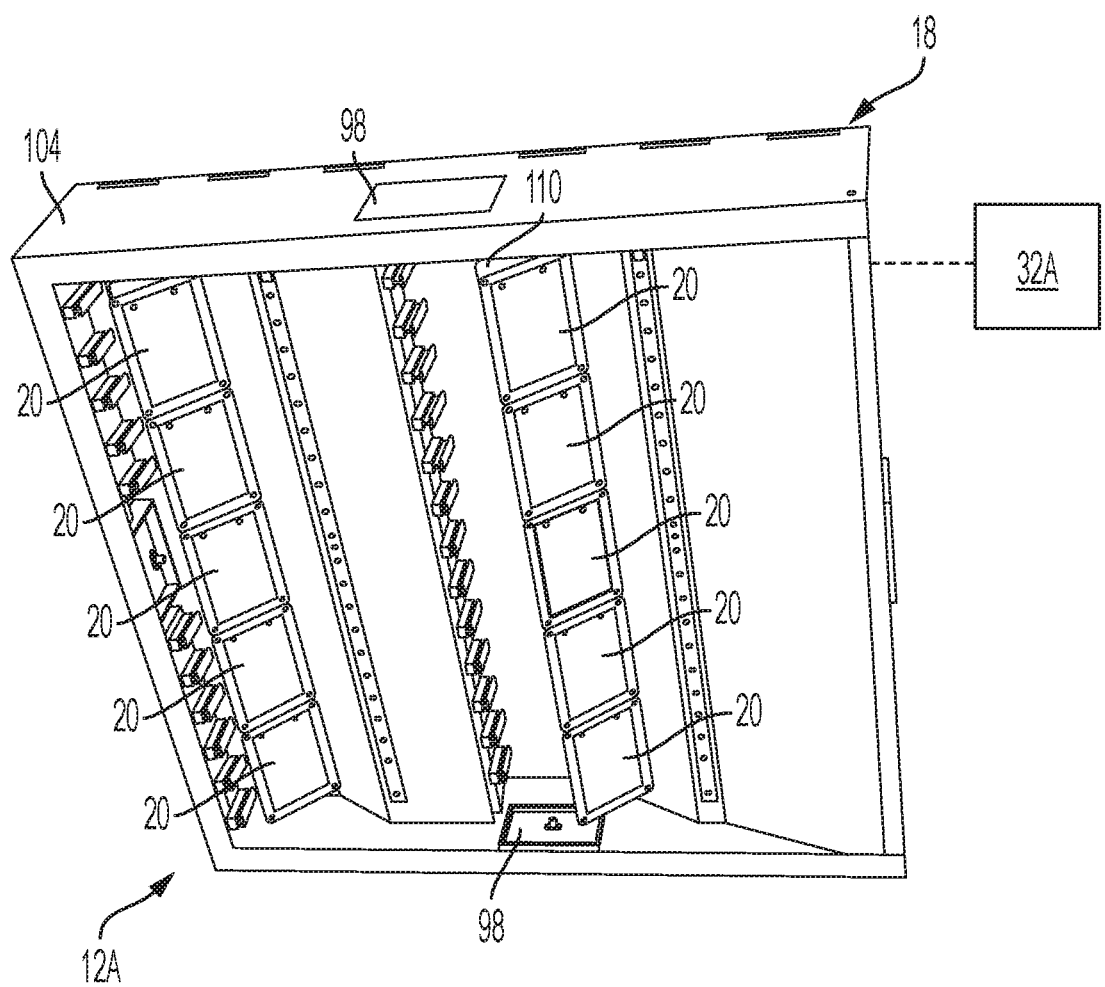
FIG. 7 shows a bottom view of the exemplary embodiment of the light-emitting device of FIG. 6, in accordance with the present disclosure.

Referring now to FIGS. 6-9, in one embodiment a light-emitting device 12A is configured as a light fixture, such as a troffer that is removably or permanently mounted to or installed in a ceiling or wall of a building or other structure (referred to herein as being removably or permanently mounted to or installed in a permanent structure). FIG. 6 shows an exploded view of the device 12A, FIG. 7 shows a bottom view of the device 12A (such as would be seen in a ceiling of a room), and FIGS. 8 and 9 show a front and a rear view of an exemplary light source. In one embodiment, existing and traditional lighting fixtures can be retrofitted with light-emitting device(s) 12A in accordance with the present disclosure.

Referring to FIGS. 6 and 7, in one embodiment, and as discussed above, the device 12A includes a housing 18 and at least one light source 20 such as an array of a plurality of LEDs 22. During installation, the light-emitting device 12A may be connected to a native power source 32A, as was the traditional lighting fixture. Additionally or alternatively, the device 12A may include a primary and/or backup battery 32, as discussed above. In one embodiment, when the device 12A is not activated to emit random disabling light flashes, the device 12A emits a "normal" amount of light (that is, the same as a traditional lighting fixture) that is not disruptive or disabling to a user. Thus, the device 12A looks like a traditional lighting fixture and can be used in locations such as schools, airports, movie theaters, and government buildings. Further, in one embodiment the device 12A is remotely activated using a remote control, wall switch, or other means.

Continuing to refer to FIGS. 6 and 7, in one embodiment the transceiver 50 is a transceiver assembly 51 that generally includes a plurality of antennas 98 each connected to an antenna splitter 100 by one or more cables or wired connections 102. In such a configuration, the transceiver assembly 51 is considered to be part of the operational unit 36 of the device 12A and, like the general transceiver 50 discussed above, is in communication with the processing circuitry 26 and other components of the operational unit 36. In one embodiment, each side of the housing 18 may include an antenna 98; however, it will be understood that the device 12A may include more or fewer antennas than shown. In one optional embodiment, each antenna is contained within a housing with a face that is visible from the housing 18 of the device 12A and that may include a logo, insignia, source indicator, or other information or design.

Continuing to refer to FIGS. 6 and 7, and with reference to FIGS. 8 and 9, in one embodiment the housing 18 of the device 12A generally includes a base 104 and a lid panel 106, and further includes at least one attachment element 108 for coupling or mounting the housing 18 to the permanent structure. In one embodiment, the housing 18 further includes at least one mounting bracket 110 to which the at least one light source 20 are configured to be coupled. In one non-limiting example, each mounting bracket 110 is configured to receive and retain a plurality of light sources 20 in a desired position, such as those light sources 20 shown in greater detail in FIGS. 8 and 9. Thus, a plurality of light sources 20, mounted to a mounting bracket 110, may be installed in the housing 18 at once, thereby facilitating replacement, exchange, and maintenance of the light sources 20. In one embodiment, each light source 20 includes a housing 112, a plurality of LEDs 22 (or other light-emitting elements), a plurality of cooling fins 114 coupled to a rear of the housing 112 for temperature regulation of the light source 20, and one or more coupling elements 116 that are configured to engage with complementary coupling elements of a mounting bracket 110 to removably couple each light source 20 to a mounting bracket 110. In some embodiments, the housing 18 may also include a transparent or translucent panel affixed to the base 104 that shields the light sources 20 and may help diffuse ambient or "normal" light produced by the light sources 20, but not obstruct disabling light flashes when emitted by the light sources 20. In some embodiments, the housing 18 may also include one or more trays, panels, mounting brackets, sub-housings, or other elements within the housing 18 for retaining, concealing, and/or organizing components of the device 12.

Referring now to FIG. 10, in one embodiment a light-emitting device 12B is configured as a concealed light fixture with control panel 118. As discussed above regarding the light fixture 12A shown in FIGS. 6 and 7, in one embodiment the concealed light fixture 12B with control panel 118 is removably or permanently mounted to or installed in a ceiling or wall of a building (permanent structure) and is connectable to a native power source 32A. Additionally or alternatively, the light-emitting device 12B may include a primary and/or backup battery. In one embodiment, the light-emitting device 12B of FIG. 10 is a device such as a smart mirror, in which a control panel 118 is displayed when the device 12B is in an active control state and in which the control panel 118 disappears or is hidden when the device 12B is in an inactive state. In one embodiment, the device 12B includes a housing 18 (such as a frame, which may be decorative), a screen 120, and a two-way mirror overlay 122. In one embodiment, the two-way mirror overlay 122 is composed of glass, acrylic, or other transparent/translucent material. The control panel 118 is displayed by the screen 120 and viewable through the two-way mirror overlay 122. In one embodiment, the screen 120 and two-way mirror overlay 122 together form a touchscreen (such as a resistive, capacitive, infrared, or other type of touchscreen). Additionally or alternatively, the device 12B includes and/or is configured for use with a user input device such as a mouse and/or keyboard. In one embodiment, the device 12B may be manually activated by an authorized user's interaction with the control panel 118, and the control panel 118 may display the status of the device 12B, warnings, or other messages.

Continuing to refer to FIG. 10, in one embodiment the at least one light source 20 is an array of a plurality of LEDs 22 (not visible in FIG. 10) located behind the two-way mirror overlay 122. When the system 10 is activated, the device 12B is in an active state and the at least one light source 20 emits a random pattern of disabling light flashes through the two-way mirror overlay 122. Thus, when the device 12B is in the inactive state and/or the active control state, the LEDs 22 are concealed and the at least one light source 20 does not emit light. In one embodiment, the device 12B may be mounted to a wall or other surface to provide an attractive mirrored surface when the device 12B is in the inactive state. Further, in one embodiment, the device 12B includes a manual activation mechanism 68 with authorization component to prevent targets or other unauthorized users from manually activating or deactivating the light-emitting device 12B. Further, as with all embodiments of the device 12, the device 12B of FIG. 10 includes the operational unit 36 as shown and described in FIGS. 1 and 2, and, optionally, additional components that make the device 12B suitable for its intended purpose.

Referring now to FIG. 11-13, in one embodiment a light-emitting device 12C is configured as a stun grenade (or "flash-bang" grenade). FIG. 11 shows an exemplary embodiment of an assembled device 12C, FIG. 12 shows the operational unit 36 of the device 12C partially exposed from the housing 18, and FIG. 13 shows the operational unit 36 of the device 12C with at least one LED panel 124 removed for visualization of other components of the operational unit 36. Currently known stun or flash-bang grenades have several drawbacks, namely: they sometimes can be lethal, as they include flammable or explosive material; they can only be used once; they have a limited effective area; and they cannot be used in the same room as law enforcement officers, soldiers or military personnel, security personnel, or the like. The stun grenade device 12C of the present disclosure does not suffer from these limitations.

Referring to FIG. 11, and with reference to FIGS. 12 and 13, in one embodiment, the size and shape of the housing 18 is configured such that the device 12C can be held in a user's hands and thrown into a target location. Optionally, in one embodiment, the device 12C can be delivered into a building or confined space (such as through a window) by a launcher configured for such use without damage to the housing 18. In one embodiment, the housing 18 has approximately the dimensions of a tall soda can. In one embodiment, in addition to the components discussed above regarding FIGS. 1 and 2, the device 12C also includes one or more speakers or sound-generating elements 38, as shown in FIGS. 12 and 13, for creating a loud noise to disorient and/or startle the target. This loud noise, in combination with the random pattern of disabling light flashes, makes the device 12C an effective, non-lethal tool, particularly in SWAT and military operations, as well as hostage situations. As the device 12C is used with synchronized protective eyewear 14, the device 12C can be used in the presence of authorized users and in confined spaces. Further, the device 12C can be used multiple times, are truly non-lethal, and can be used in the presence of flammable or explosive material. Still further, multiple devices 12C may be used to increase the effective area.

Referring to FIGS. 12 and 13, the internal components of the device 12C are shown in greater detail. In one embodiment, at least a portion of the housing 18 is composed of a translucent/transparent material through which light emitted by the at least one light source 20 may pass. In one non-limiting example, the housing 18 includes a tubular or at least substantial tubular surface 126 extending from a first end to a second end of the device 12C, which may be graspable by the user, and a substantial portion of the surface 126 is composed of the translucent/transparent material. Alternatively, an entirety of the surface 126 may be composed of the translucent/transparent material such that disabling light flashes may be emitted through nearly all of the surfaces of the device 12C (except, for example, caps 128 at the first and second ends of the device 12C). Further, in one embodiment, a portion of the surface 126 of the housing 18 is flat or planar, rather than curved, to enable the device 12C to come to rest on that flattened surface 132 after the device 12C is thrown.

Continuing to refer to FIGS. 12 and 13, in one embodiment, the device 12C includes a plurality of LED panels 124 that together comprise the light source 20. Each LED panel 124 includes at least one LED 22 and, optionally, a speaker or other audio device 38A, which may be an audio device the is an additional component 38 of a sensor module 40, or a separate audio device 38A that is not directly associated with or in direct communication with one or more sensors 24. In one embodiment, the plurality of LED panels 124 are coupled to one or more frame elements 130 sized and configure to fit within the housing 18.

Referring to FIG. 12, the operational unit 36 may include additional components that are also coupled to the frame elements 130 and/or located within the housing 18, which are shown in FIG. 12 by the removal of an LED panel 124. In one embodiment, the operational unit 36 includes a power source 32, such as a battery, that also functions as a ballast. For example, the power source 32/ballast may be positioned within the housing 18 proximate the flattened surface 132 to further encourage the device 12C to come to rest on the flattened surface 132 when the device 12C is thrown, projected, or rolled, and such that the light source 20 faces upward and the emitted random pattern of disabling light flashes are visible. In one embodiment, the operational unit 36 includes a voltage source 31. Further, in one embodiment the processing circuitry 26 and/or other components of the operational unit 36 (for example, the communications controller 28 or identification module 30) are included on at least one printed circuit board 134. In one embodiment, the light-emitting device 12C also includes a manual activation mechanism 68 (for example, as disclosed above regarding FIGS. 1 and 2) that an authorized user can use to activate the device 12C. Additionally or alternatively, the device 12C may be remotely activated.

Figure 16:
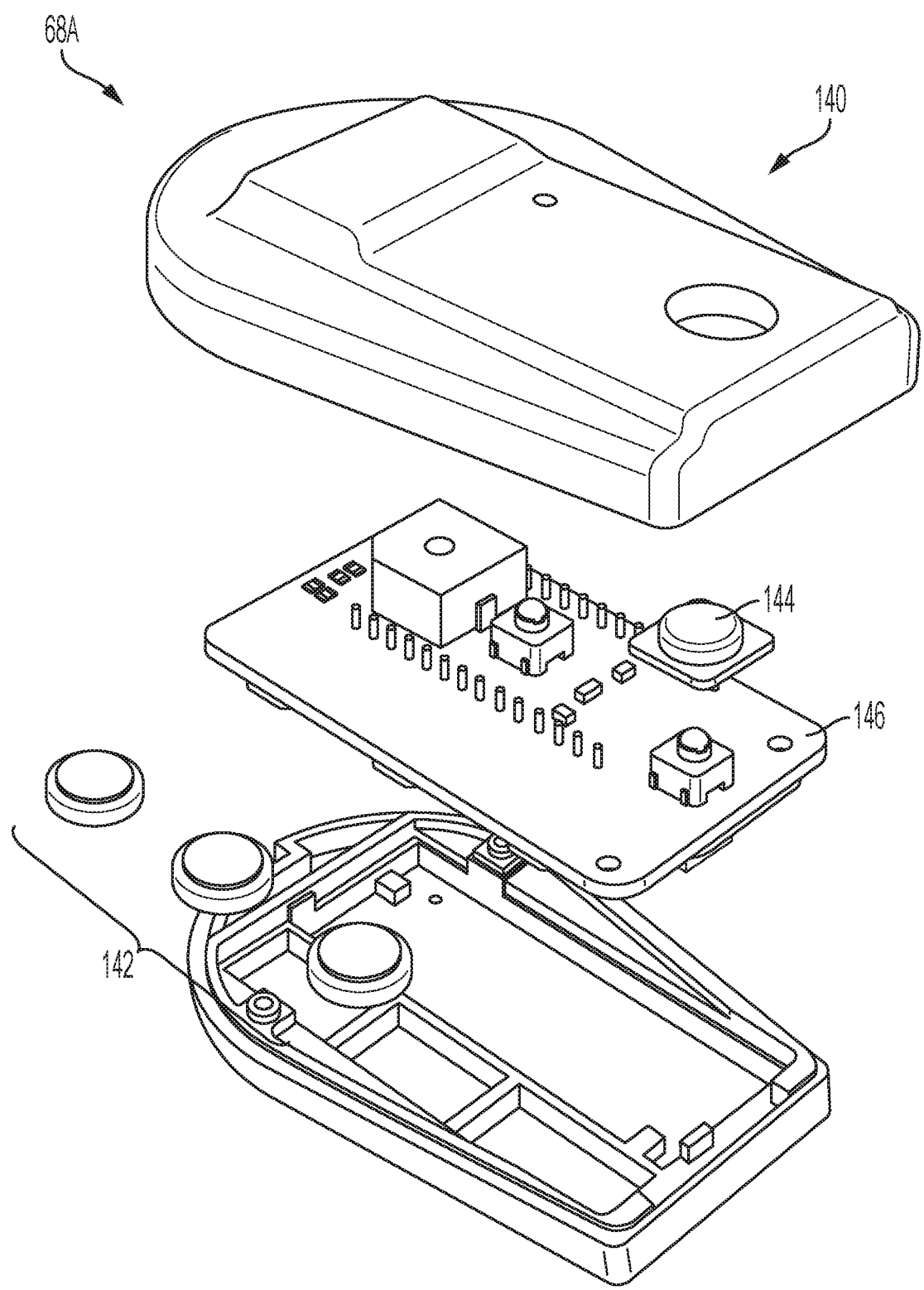
FIG. 16 shows an exploded view of an exemplary embodiment of a light-emitting device configured as a hand-held panic button, such as for use as part of a tactical lighting system, in accordance with the present disclosure.

Referring now to FIGS. 14 and 15, in one embodiment a light-emitting device 12D is configured to be removably attachable, such as to a vest, shield 136 (for example, a riot shield as shown in FIG. 16), or other piece of equipment. In one embodiment, the device 12D includes at least one coupling element 138 integrated with or attached to the housing 18. In one non-limiting example, the at least one coupling element 138 includes clasp(s), clamp(s), clip(s), threading, magnet(s), pin(s), or the like. Although not shown, the equipment to which the light-emitting device is attached may include complementary coupling element(s) that engage with the coupling element(s) on the device 12D. In one embodiment, the housing 18 is sized and configured to be removably attached to a tactical vest (such as a bulletproof vest), a shield 136 (such as a riot shield used by law enforcement officers), or to items of personal protective equipment (such as jackets, helmets, or other equipment worn by firefighters). Additionally or alternatively, in some embodiments the device 12D may be used as a stand-alone, hand-held device that is detached from another piece of equipment. Further, the size, shape, and configuration of the housing 18 may depend on the size, shape, and configuration of the equipment to which the device 12D is attached. In one embodiment, the device 12D may be manually transitioned by the wearer between a passive lighting state and an active state, such as with a manual activation mechanism 68 discussed above. In the passive lighting state, the device 12D may emit non-disabling light or "normal" light and is usable as a flashlight. In the active state, the device 12D emits a random pattern of disabling light flashes, as discussed above. Although the device 12D is discussed herein as being removably attachable to another device or item of equipment, it will be understood that the device 12D may instead be permanently attached to or integrated with another device or item of equipment.

Referring now to FIG. 16, an exploded view of an exemplary remote control 68A is shown, wherein the remote control 68A may be used as a panic button or user interface for rapid activation of the system 10. For example, the remote control 68A may be kept at a user's (for example, a teacher's) desk or in a pocket and, if a potential threat is identified, the user may simply depress a single button to instantly activate the system 10 and, optionally, sent an alarm or alert signal to a first responder. In one embodiment, the remote control 68A generally includes a housing 140, a power source 142 (for example, at least one battery), an activation button 144, and a circuit board 146 bearing or including processing circuitry, a wireless communications module, and/or other components for communicating with (that is, sending wireless signals to) at least one light-emitting device 12, at least one item of protective eyewear 14, a remote server 46, and/or first responder. Optionally, the remote control 68A may also include one or more microphones and/or speakers for enabling audio communication between the user and a first responder.

Embodiments

In one embodiment, a lighting system comprises: at least one light-emitting device; and at least one item of protective eyewear in wireless communication with the light-emitting device, the protective eyewear being configured to transition between a first state and a second state according a signal received from the light-emitting device.

In one aspect of the embodiment, the at least one light-emitting device includes a random seed generator that generates a random pattern, the at least one light-emitting device being configured to transmit a signal to the at least one item of protective eyewear, the signal including the random pattern.

In one aspect of the embodiment, the at least one light-emitting device includes an identification module and the at least one item of protective eyewear includes an identification module, the at least one light-emitting device transmitting the signal to the at least one item of protective eyewear when the identification module of the at least one light-emitting device recognizes the identification module of the at least one item of protective eyewear as being an authorized device.

In one aspect of the embodiment, the at least one light-emitting device is configured to emit a plurality of disabling light flashes according to the random pattern. In one aspect of the embodiment, the at least one item of protective eyewear is in a first state when the at least one light-emitting device is not emitting a disabling light flash of the plurality of disabling light flashes and is in a second state when the at least one light-emitting device is emitting a disabling light flash of the plurality of disabling light flashes.

In one aspect of the embodiment, the at least one item of protective eyewear includes at least one lens, the at least one lens being in a transparent condition when the protective eyewear is in the first state and the at least one lens being in an opaque condition when the protective eyewear is in the second state.

In one aspect of the embodiment, the at least one light-emitting device is a light fixture configured to be installed in a permanent structure.

In one aspect of the embodiment, the at least one light-emitting device is a stun grenade.

In one aspect of the embodiment, the at least one light-emitting device is configured to be removably attached to at least one of a bulletproof vest and a riot shield.

In one aspect of the embodiment, the at least one light-emitting device includes processing circuitry, a communication controller, and at least one sensor, the at least one sensor being in communication with the processing circuitry and the communication controller. In one aspect of the embodiment, the at least one light-emitting device includes a plurality of light-emitting devices, the plurality of light-emitting devices being in wireless communication with each other. In one aspect of the embodiment, the at least one sensor of each of the plurality of light-emitting devices is configured to record environmental data, the communication controller of each of the plurality of light-emitting devices being configured to transmit the recorded environmental data of a corresponding at least one sensor to the other of the plurality of light-emitting devices. In one aspect of the embodiment, the processing circuitry of at least one of the plurality of light-emitting devices is configured to: compile the recorded environmental data; determine at least one environmental characteristic based on the compiled environmental data; and at least one of automatically activate the plurality of light-emitting devices and transmitting the determined at least one environmental characteristic to a remote device.

In one aspect of the embodiment, the at least one sensor is an audio sensor and the processing circuitry of the at least one of the plurality of light-emitting devices is configured to automatically activate at least one of the plurality of light-emitting devices when the audio sensor detects a sound having a decibel level of approximately 120 dB.

In one aspect of the embodiment, the at least one sensor includes a smoke sensor and an infrared sensor and the at least one environmental characteristic is a smoke density, the processing circuitry of the at least one of the plurality of light-emitting devices being configured to adjust a brightness of the disabling light flashes based on the determined smoke density.

It will be appreciated by persons skilled in the art that the present invention is not limited to what has been particularly shown and described hereinabove. In addition, unless mention was made to the contrary, it should be noted that all of the accompanying drawings are not to scale. A variety of modifications and variations are possible in light of the above teachings without departing from the spirit of the invention, which is limited only by the following claims.

What is claimed is:

1. A lighting system comprising:
    at least one light-emitting device, the at least one light-emitting device being configured to emit a pattern of a plurality of disabling light flashes, the at least one light-emitting device including a first identification module and a random seed generator configured to generate a random pattern; and
    at least one item of protective eyewear in wireless communication with and synchronized with the light-emitting device, the at least one item of protective eyewear including a second identification module and being configured to transition between a first state and a second state according to a signal received from the light-emitting device,
    the at least one light-emitting device being configured to transmit a signal to the at least one item of protective eyewear only when the first identification module recognizes the second identification module as being associated with an authorized device, the signal including the random pattern.

2. The lighting system of claim 1, wherein the at least one light-emitting device is configured to emit the plurality of disabling light flashes according to the random pattern, each of the plurality of disabling light flashes being at least approximately 100,000 lumens.

3. The lighting system of claim 2, wherein the at least one item of protective eyewear is in the first state when the at least one light-emitting device is not emitting a disabling light flash of the plurality of disabling light flashes and is in the second state when the at least one light-emitting device is emitting a disabling light flash of the plurality of disabling light flashes.

4. The lighting system of claim 3, wherein the at least one item of protective eyewear includes at least one lens, the at least one lens being in a transparent condition when the at least one item of protective eyewear is in the first state and the at least one lens being in an opaque condition when the at least one item of protective eyewear is in the second state.

5. The lighting system of claim 1, wherein the at least one light-emitting device is a light fixture configured to be installed in a permanent structure.

6. The lighting system of claim 1, wherein the at least one light-emitting device is a stun grenade.

7. The lighting system of claim 1, wherein the at least one light-emitting device is configured to be removably attached to at least one of a bulletproof vest and a riot shield.

8. The lighting system of claim 1, wherein the at least one light-emitting device includes processing circuitry, a communication controller, and at least one sensor, the at least one sensor being in communication with the processing circuitry and the communication controller.

9. The lighting system of claim 8, wherein the at least one light-emitting device includes a plurality of light-emitting devices, the plurality of light-emitting devices being in wireless communication with each other.

10. The lighting system of claim 9, wherein the at least one sensor of each of the plurality of light-emitting devices is configured to record environmental data, the communication controller of each of the plurality of light-emitting devices being configured to transmit the recorded environmental data of a corresponding at least one sensor to the other of the plurality of light-emitting devices.

11. The lighting system of claim 10, wherein the processing circuitry of at least one of the plurality of light-emitting devices is configured to:
    compile the recorded environmental data of each of the plurality of light-emitting devices;
    determine at least one environmental characteristic based on the compiled environmental data; and
    at least one of automatically activate the plurality of light-emitting devices and transmitting the determined at least one environmental characteristic to a remote device.

12. The lighting system of claim 11, wherein the at least one sensor is an audio sensor and the processing circuitry of the at least one of the plurality of light-emitting devices is configured to automatically activate at least one of the plurality of light-emitting devices when the audio sensor detects a sound having a decibel level of approximately 120 dB.

13. The lighting system of claim 11, wherein the at least one sensor includes a smoke sensor and an infrared sensor and the at least one environmental characteristic is a smoke density, the processing circuitry of the at least one of the plurality of light-emitting devices being configured to adjust a brightness of the plurality of disabling light flashes based on the smoke density.

* * * * *